(12) United States Patent
Kuhara et al.

(10) Patent No.: US 6,975,812 B1
(45) Date of Patent: Dec. 13, 2005

(54) OPTICAL COMMUNICATION DEVICE

(75) Inventors: Yoshiki Kuhara, Osaka (JP); Naoyuki Yamabayashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 464 days.

(21) Appl. No.: 09/773,546

(22) Filed: Feb. 2, 2001

(30) Foreign Application Priority Data

Feb. 9, 2000 (JP) .............................. 2000-031891

(51) Int. Cl.$^7$ .......................................... H04B 10/08
(52) U.S. Cl. ............................ 398/21; 398/70; 398/71; 398/72; 398/79; 398/9; 398/10; 398/13; 398/16; 398/17; 398/20; 398/140; 398/141; 398/151; 385/24; 385/15; 356/73.1
(58) Field of Search ................................ 398/141, 140, 398/153, 165, 135, 138, 139, 9, 10, 13, 16, 398/17, 20, 70, 71, 72, 84, 87, 21, 79, 151; 385/24, 37, 14, 27, 89, 140, 91, 92, 88, 15; 356/73.1

(56) References Cited

U.S. PATENT DOCUMENTS

| | | | | |
|---|---|---|---|---|
| 5,257,332 A | * | 10/1993 | Pimpinella | .................... 385/59 |
| 5,319,482 A | * | 6/1994 | Tsuchiya et al. ................ 398/9 |
| 5,680,234 A | * | 10/1997 | Darcie et al. ................... 398/9 |
| 5,859,945 A | * | 1/1999 | Kato et al. ...................... 385/89 |
| 5,937,120 A | * | 8/1999 | Higashi ......................... 385/49 |
| 6,188,495 B1 | * | 2/2001 | Inoue et al. ................. 398/135 |
| 6,192,170 B1 | * | 2/2001 | Komatsu ...................... 385/15 |
| 6,269,204 B1 | * | 7/2001 | Ishikawa ...................... 385/24 |
| 6,310,702 B1 | * | 10/2001 | Minami et al. ................. 398/9 |
| 6,388,741 B1 | * | 5/2002 | Beller ........................ 356/73.1 |

OTHER PUBLICATIONS

A. Morinaka et al. "Filter-type PLC-WDM Circuit with 1.65$\mu$m cut/ref. filter" Proceedings of the 1998 IEICE General Conference, Mar. 27-30, 1998, C-3-158.

R. Takahashi et al. "Packaging of Optical Semiconductor Chips for SFF Optical Transceiver" Proceedings of the 1998 IEICE General Conference, Sep. 7-10, 1999, C-3-28.

H. Takahashi et al. "A 2.5 Gb/s, 4-Channel Multiwavelength Light Source composed of UV Written Waveguide Gratings and Laser Diodes Integrated on Si" ECOC 97, Sep. 22-25, 1997, Conference Publication No. 448, pp. 355-358.

* cited by examiner

Primary Examiner—Hanh Phan
(74) Attorney, Agent, or Firm—Smith, Gambrell & Russell, LLP

(57) ABSTRACT

The detection light reflection function is given to PLC type LD, PD or LD/PD modules having light guides and optoelectronic chips (LD, LED, PD or APD) by forming a grating on the light guides which selectively reflects only the detection light.

8 Claims, 8 Drawing Sheets

OPTICAL COMMUNICATION DEVICE

BACKGROUND OF THE INVENTION

1. Field of the Invention

This invention relates to an optical transmitting device, an optical receiving device or a unified optical transmitting/receiving device.

This application claims the priority of Japanese Patent Application No. 2000-31891 filed on Feb. 9, 2000 which is incorporated herein by reference.

The devices are called an optical communication device as a whole. Namely, the present invention includes three sorts of concrete devices,
1. optical transmitting device,
2. optical receiving device, and
3. optical transmitting/receiving device.

This invention can be applied to all the three kinds of the optical communication devices.

This invention aims at an improvement of the optical communication devices for finding disorders by observing the reflection of monitoring light from the devices. The present invention aims at providing, in particular, a low-cost, small-sized optical transmission or optical receiving devices suitable for the subscriber systems or the ONU (optical network unit) systems. The contrivance of reflecting monitoring light is installed to the optical communication devices for finding a break of the fibers which connect the unit to other units. The distinction of the reflecting light from the fiber notifies an occurrence of a trouble of a fiber-break. This invention aims at an inexpensive monitoring contrivance which would not raise the cost of the ONU module so much:

2. Description of Related Art

Figure 1:
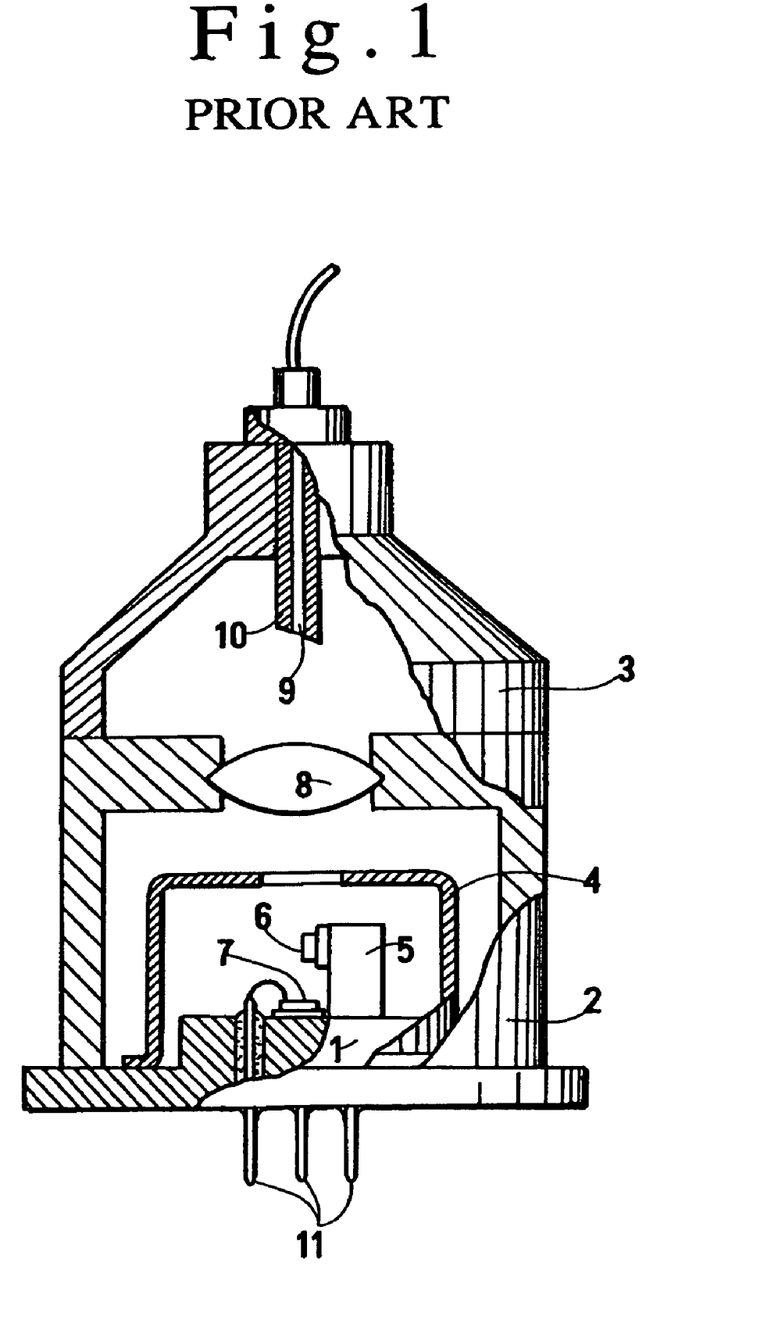
FIG. 1 is a vertically sectioned view of a prior LD module having a three dimensional structure stored in a cylindrical metal can package.
Figure 2:
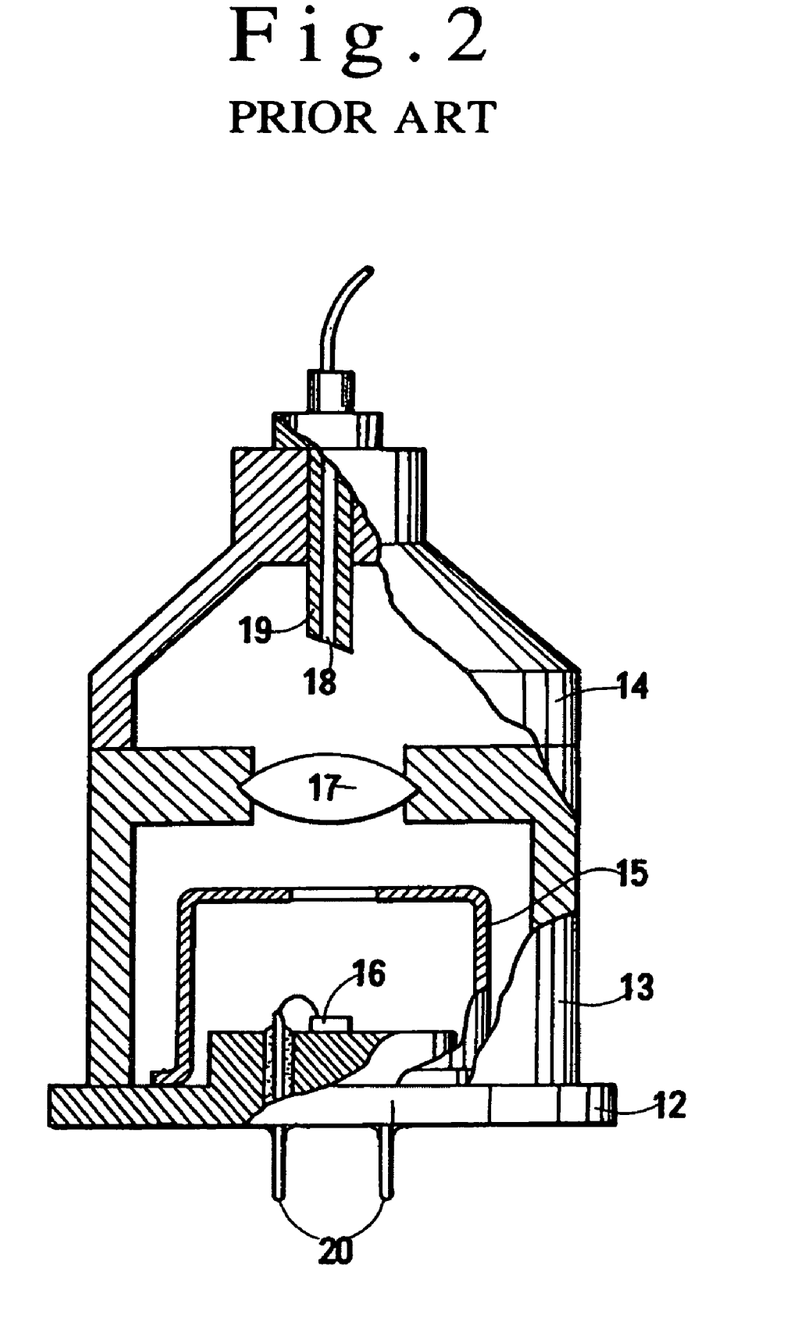
FIG. 2 is a vertically sectioned view of a prior PD module having a three dimensional structure stored in a cylindrical metal can package.

In prior optical communication systems, optical transmission devices, optical receiving devices or optical transmitting/receiving devices have been constructed by assembling the LD module (prior art) of FIG. 1 or the PD module (prior art) as shown in FIG. 2. The LD module of FIG. 1 hermetically seals an LD chip in a metal can package having a three-dimensional structure. The external shell portion is built with a metal stem 1, a cylindrical metal lens holder 2 and a conical metal ferrule holder 3. The shell forms a firm structure in which the parts are bound by welding. A cylindrical cap 4 having an opening is fixed upon the stem 1 in the package.

An LD chip 6 is mounted upon a side of a pole 5 erected on the stem 1. A PD chip 7 for monitoring the power of the LD 6 is furnished just beneath the LD chip 6 upon the stem 1. A lens 8 for converging the LD light is held at the upper opening of the lens holder 2. The ferrule holder 3 has a vertical narrow hole which maintains a ferrule 10. The ferrule 10 keeps an end of an optical fiber 9. The ends of the ferrule 10 and the fiber 9 are polished slantingly for preventing the light reflected at the fiber end from returning into the LD chip 6. The round stem 1 has a set of lead pins 11 which are input or output terminals of sending signals or monitoring signals.

The LD chip 6 emits forward signal light (sending light) including sending information. The signal light is converged by the lens 8 and is guided into the optical fiber 9. The signal light propagates in the fiber 9 to another unit. The LD module which is hermetically sealed by the metal package has high reliability. Such a metal-can type LD module has been widely employed in optical information systems. However, the metal sealed module is expensive due to high parts cost and high assembling cost. The high cost derives from alignments for seeking the optimum positions of the LD chip 6, the lens 8 and the fiber 9 by displacing the stem 1, the lens holder 2, the ferrule holder 3 and the ferrule 10 three-dimensionally in the X, Y and Z-directions and measuring the output power at the other end of the fiber 9. The alignment takes a long time. The alignment enhances the cost of the LD module of FIG. 1.

FIG. 2 shows a prior art PD module. The PD module has also a three-dimensional structure like the LD module of FIG. 1. The PD module has a round metallic stem 12, a circular metallic lens holder 13 and a conical metal ferrule holder 14 as a metallic package. In the inner space of the package, a round cap 15 with a top opening is fixed to the stem 1. The stem 12 has a PD chip 16 at the center. A lens 17 is kept in the top opening of the lens holder 13 just above the PD chip 16. A vertical top hole of the ferrule holder 14 sustains a ferrule 19 which seizes an end of an optical fiber 18. The prior PD module also requires three dimensional alignments including two dimensional alignments among the stem 12, the lens holder 13 and the ferrule holder 14 in the planar directions and a one dimensional alignment of the ferrule 19 in the axial direction. At present, the PD module of FIG. 2 and the LD module of FIG. 1 having the three-dimensional structure are widely employed in the optical communication systems.

Figure 3:
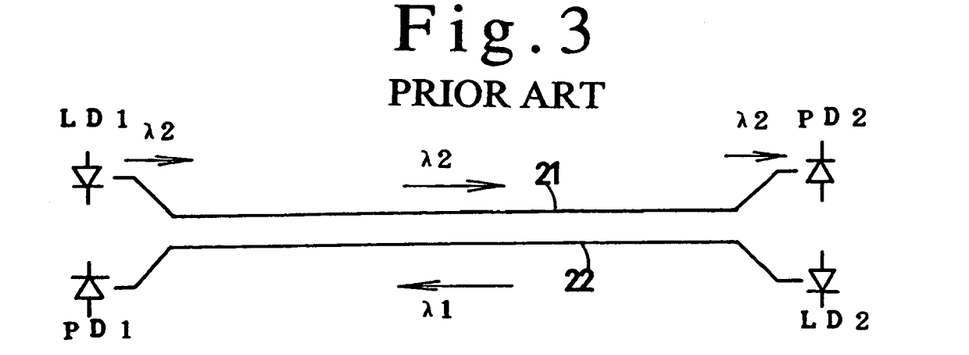
FIG. 3 is a schematic view of a binary fiber bidirectional simultaneous optical communication system which couples a central station (base station) to subscribers with two fibers which carry downward signals and upward signals independently.

FIG. 3 schematically shows a two-fiber type optical communication system. A central station has an LD1 and a PD1. A subscriber (ONU) has an LD2 and a PD2. The central station sends signals from the LD1 to the subscriber PD2 through an optical fiber 21. The signals from the station to the ONU are called downstream signals. The ONU sends signals from the LD2 to the central station through another optical fiber 22. The signals are called upstream signals. The fiber 21 is inherent to the downstream signals. The fiber 22 is an exclusive medium for the upstream signals. The upstream signals and the downstream signals propagate in the different fibers 22 and 21. The two fibers 21 and 22 enable the light of a single frequency to transmit signals in two directions simultaneously. The advantage of the two fiber type is the probability of realizing the simultaneous bidirectional transmission with the single frequency light.

Such a two-fiber type optical communication system was suggested, for example, by;
①R. Takahashi, K. Murakami, Y. Sunaga, T. Tokoro, M. Kobayashi, "Packaging of optical semiconductor chips for SFF optical transceiver", PROCEEDINGS OF THE 1999 ELECTRONICS SOCIETY CONFERENCE OF IEICE, C-3–28, p 133(1999).

This report discussed the problem of the optical crosstalk but says nothing about the detection of disorder.

Figure 4:
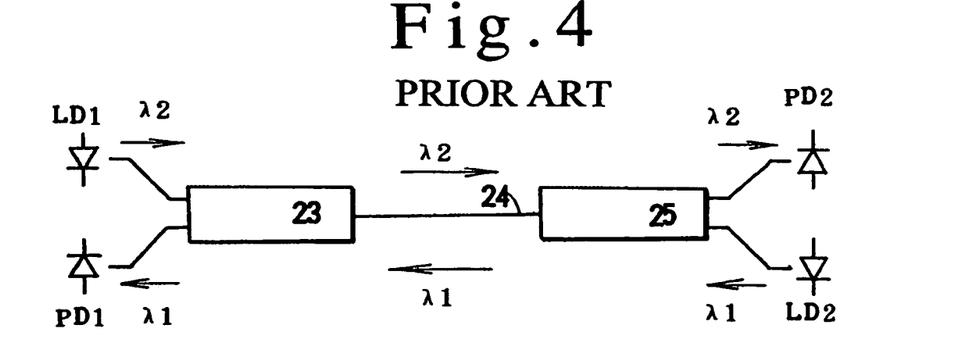
FIG. 4 is a schematic view of a multiwavelength bidirectional simultaneous optical communication system which couples a central station (base station) to subscribers with a single fiber which carries downward signals and upward signals simultaneously and selects the downward signals and the upward signals by WDMs having wavelength selectivity.

FIG. 4 shows a single-fiber type optical communication system which transmits signal light in two directions in a single fiber. A central station has an LD1 and a PD1. An ONU has an LD2 and a PD2. The central station and the subscriber are connected by a single optical fiber 24. This system can make use of the light of the same frequency when the signals are transmitted in both directions at different times (ping-pong transmission), since no cross talk happens between the signals which are transmitted in two directions. However, in the case of the simultaneous bidirectional transmission, two different wavelengths $\lambda 1$ and $\lambda 2$ of signal light should be required for separating the bidirectional signals. The upward signal should ride on a first wavelength $\lambda 1$ and the downward signal should be carried by a second wavelength $\lambda 2$. For separating two wavelengths, wavelength division multiplexers 23 and 25 should be placed at the both ends of the optical fiber 24. The wavelength division multiplexers 23 and 25 discriminate the downward signal λ2 from the upward signal λ1.

Figure 5:
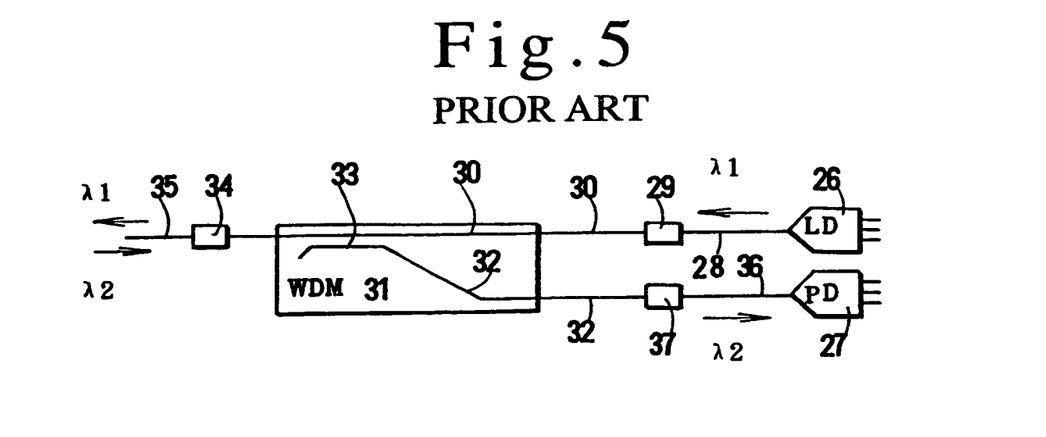
FIG. 5 is a schematic view of the subscriber site of the multiwavelength bidirectional simultaneous optical communication system which couples a central station to subscribers with a single fiber which carries downward signals and upward signals simultaneously.

For example, the bidirectional system employs an optical transmission/reception apparatus as shown in FIG. 5 for the ONU terminal. The ONU has an LD module 26 and a PD module 27. Both modules of the LD and the PD are independent, as shown in FIG. 1 and FIG. 2. The LD module 26 makes upward signals of λ1. The upward signals λ1 pass an optical fiber 28, an optical connector 29, an optical fiber 30 and go into a WDM 31 on the ONU. The WDM 31 has a kind of coupler with wavelength selectivity. The sending signals λ1 pass a fiber 30 in the WDM, an optical connector 34 and propagates in a fiber 35. The fiber 35 communicates with the central station. The downward signals λ2 from the central station to the ONU terminal propagate in the fibers 35 and 30 and enter the WDM 31. The WDM 31 changes the path of λ2 from the fiber 30 into a fiber 32. The receiving signal light λ2 passes a connector 37, goes in a fiber 36 and enters the PD module 27. The WDMs and the different frequency light enable the system to carry out the simultaneous bidirectional optical communication.

Figure 6:
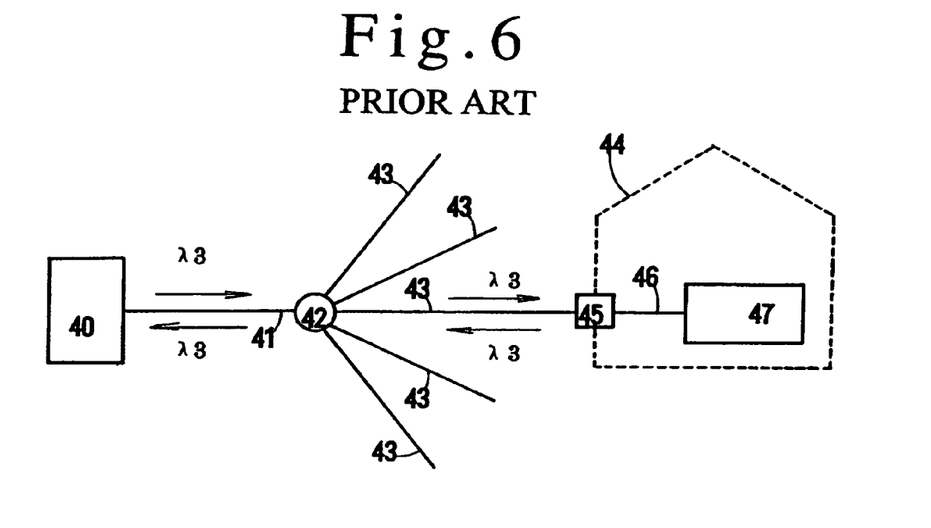
FIG. 6 is a schematic view of the subscriber site of the multiwavelength bidirectional simultaneous optical communication system which couples a central station to subscribers with a single fiber which carries downward signals and upward signals simultaneously and tries to detect troubles occurring in the fiber by a detection light reflector installed at an interface between the indoor space and the outdoor space.

The prior art of the optical communication has been surveyed. The systems have been equipped with an apparatus of detecting a trouble of fiber break. For example, as shown in FIG. 6, the trouble detecting apparatus includes an extra light source which can emit light of a third frequency λ3 that is different from λ1 and λ2 at a central station 40 and a selective reflection device 45 which only reflects the λ3 light at the ONU. Sometimes the central station 40 sends the λ3 detection light to the ONU for detecting an occurrence of a fiber break trouble. If the fiber is normal, the detecting light λ3 is reflected by the reflection device 45 at the ONU and returns to the central station 40. If the fiber breaks at a spot, the detecting light λ3 is not reflected by the reflection device 45 at the ONU and does not return to the central station 40. The existence of the returning λ3 light confirms the normal fiber without break. The extinction of the returning λ3 light means an occurrence of the fiber break.

For example, FIG. 6 shows an optical subscriber system having a ratio of 1:N (N=16, 32 or so). Here, "1" means a fiber from the central station 40. "N" means the number of the subscribers connected to the central station through the same fiber. The central station 40 sends a downward signal λ2 via a fiber 41. The downward signal is divided by a 1:N divider 42 into N (e.g., N=16) subscribers through N fibers 43, 46. An ONU LD/PD module 47 is installed in a house 44 of the subscriber. The in-house LD/PD module 47 senses the λ2 signal. The LD/PD module 47 in the house is an apparatus having the LD module and the PD module as shown in FIG. 5.

The subscriber on an ONU transmits inherent upward signals via the fibers 43 and 41 to the central station 40 by λ1 light, e.g., 1.3 μm band light. The central station 40 receives the upward signals from the sixteen subscribers. Furthermore, the system has a fiber-break detection device which investigates whether the fiber network is normal or abnormal. The fiber-break detection device includes a detection light generator in the central station 40 and detection light reflectors 45 provided at outer walls of the houses 44 of the ONUs.

The detection light wavelength λ3 is different from both the downward light λ2 and the upward light λ1 which transmit signals. For example, the detection light λ3 is 1.65 μm light. The central station 40 sends the detection light λ3 to the ONUs of the subscribers. If the fiber is normal, the detection light λ3 is reflected at the detection light reflector 45 on the walls of the houses 44 and the returning light is sensed by the PD in the central station 40. The return of the detection light confirms the normality of the net work. If the fiber is broken at some spot, the detection light λ3 does not arrive at the detection light reflector 45 and is not sensed by the PD in the central station 40. If the returning light is feeble, some trouble should happen in the fibers. The fiber-break detection device examines the break of fibers, an increase of attenuation or detachment of connectors. This function is indispensable for public communication media.

The fiber-break detection device of FIG. 6 has a drawback that the detection light reflector 45 is just furnished at the interface between the indoor space and the outdoor space. The detection light reflector 45 should be designed, manufactured, sold and installed as an independent device. The installation requires the steps of cutting the optical fiber midway, inserting the detection light reflector into two ends of the cut fibers and joining the fibers to two terminals of the reflector. The independence of the reflector would require some pertinent housing for protecting the reflector, and nails, screws and nuts for installing the reflector at a wall of the house.

From the standpoint of economy, the installation of the detection light reflector invites new cost for detecting the fiber-break or other fiber disorder. The increase of cost is undesirable. Inexpensiveness is the most important matter for the optical communication to pervade wide in the general public.

Another problem is a technical one. Even if the fibers 41, 43 are all normal, there is still a possibility of the occurrence of the fiber-break or other disorders in an inner fiber 46 or connectors between the reflector 45 and the optical transmission/reception module 47 (LD/PD module) because of the detection light reflector 45 furnished at the interface. The fiber-break detection device of FIG. 6 cannot detect the occurrence of the inner fiber trouble happened in the indoor fiber 46 or the connectors. The detection system is not perfect yet. The fiber-break detection device of FIG. 6 is still an imperfect device. Being aware of the problem, someone proposes an improved detection light reflection device of adding a dielectric multilayer filter for reflecting only the detection light in the optical transmission/reception module 47 (LD/PD module). The extra dielectric multilayer filter allows the signal light to pass through without loss but reflects the detection light.

②, Akira Morinaka, Yasuyuki Inoue, Kuniharu Katoh, Hiroshi Toba, Norio Takato, "Filter-type PLC-WDM Circuit with 1.65 μm cut/ref filter", PROCEEDINGS OF THE 1998 IEICE GENERAL CONFERENCE, C-3-158, p 324(1998).

The optical transmission/reception module proposed by ② has a Y-branched optical waveguide, a PD and an LD laid at the ends of the Y-branch for simultaneous bidirectional communication and a dielectric multilayer WDM interposed in the optical waveguide for reflecting the detection light. The WDM allows the detection light to enter the PD in the module. The reflection loss of the detection light by the WDM depends upon the inclination of the WDM to the path line. Inclination angles of 3 degrees to 5 degrees would give the WDM a 10 dB to 20 dB reflection loss for 1.65 μm (detection light). The PD would be disturbed by the detection light (1.65 μm) in this case. A pertinent increase of the inclination angle of the WDM would give the WDM a 50 dB reflection loss for 1.65 μm. The report alleged that the PD would not be perturbed at all by the detection light (1.65 μm) in the case of the large inclination angle.

Economical problems and technical difficulties still accompany such a monitoring device which installs the independent reflector at the interface between the indoor space and the outdoor space, as shown in FIG. 6. The device is not matured yet for practical use. The independent reflection device requires a high performance WDM filter for accomplishing high insertion loss for 1.65 μm light. Low yield of manufacturing the high performance WDM filter would raise the cost of the WDM. The high cost would enhance the parts cost of the monitoring device itself. The assembly cost would be also raised by the additional steps of making a narrow groove on a substrate and inserting the WDM filter into the narrow groove. One purpose of the present invention is to provide a low cost detection device which can detect troubles in the fibers in high reliability.

SUMMARY OF THE INVENTION

The present invention succeeded in solving the problems by making a grating for reflecting only the detection light (e.g., 1.6 μm) on the light guide element on the same substrate of the optical communication device (LD module, PD module or LD/PD module) which has a light guide element (fiber or waveguide) and optoelectronic elements (LD, LED, PD or APD) on a substrate. Namely, this invention has two novel features of replacing the dielectric WDM by the grating formed on the light guide element and of installing the reflection element on the same substrate of the object optical communication device instead of the indoor/outdoor interface. Unification of the detecting device (grating) to the light guide element reduces both the parts cost and the manufacturing cost.

PLC type optical communication devices (LD module, PD module and LD/PD module) have a substrate, a light guide element (fiber or light waveguide) flatly formed upon the substrate and optoelectronic devices (LD, PD or LD/PD) mounted flat upon the substrate. The light guide element couples the optoelectronic device to an outer optical fiber which carries light signals. This invention gives the detection function to the optical communication device itself by forming a grating on the light guide element for reflecting only the detection light wavelength. The detection light reflection function is installed not outside the optical communication device but inside the optical communication device. The detection light reflection function is inherent to the optical communication device of the present invention. A further important matter is to form a grating on the light guide element for reflecting the detection light. This invention excludes the expensive WDM.

Thus, the present invention is characterized by two features.
1. the detection light reflection function is built in the optical communication device.
2. the light guide element is provided with the grating for the selective reflection of the detection light.

The simplified structure brings about large advantages.

This invention dispenses with the independent detection light reflector stored in a separated package. The installation of the detection light reflector at the interface is eliminated. The selective reflection function is accomplished by forming the grating on the light guide element without adding extra independent parts. No additional device is required. The number of the parts is the same as the prior optical communication device without the detection light reflector.

In the case of optical fibers, gratings can be formed on several fibers arranged in parallel by the two beam interference exposure method at a stroke, which lowers the cost of manufacturing the grating. In the case of light waveguides, gratings can be formed on the waveguides of all the chip units on the silicon wafer in the wafer process at a stretch. The mass fabrication of the gratings reduced the production cost. The present invention is free from the installation cost. The cost reduction accelerates the prevalence of the optical subscriber systems.

A further advantage of the present invention is the enlargement of the trouble detection range. Since the detection light arrives at the optical communication device in the subscriber's house, the detection light reflection element enables the communication device to detect troubles occurring between the outdoor/indoor interface and the communication device. Namely, the inner fiber 46 is joined into the object range of the trouble detection. This invention is a superb invention which can solve the aforementioned problems by storing the detection light reflection element in the LD, PD or LD/PD module.

③ Hiroshi Takahashi, Takuya Tanaka, Yuji Akahori, Toshikazu Hashimoto, Yasufumi Yamada, and Yoshio Itaya, "A 2.5 Gb/s, 4-Channel Multiwavelength Light Source composed of UV Written Waveguide Gratings and Laser Diode Integrated on Si", ECOC 97, 22–25 September 1997, Conference Publication No. 448, p 355–358 (1997).

This report discloses gratings made on waveguides. The grating, which forms a mirror on one side of a resonator of SS-LD, reflects inner light in the inner direction for determining the oscillation frequency exactly. On the contrary, the present invention reflects outer light in the outer direction. Thus, the function is different between ③ and the present invention.

This invention provides PLC optical communication devices with the detection light reflection function by allocating a grating to the light guide. The PLC optical communication devices will gain the detection light reflection function without raising cost in addition to the inherent advantages of the low cost and the small size. The superb PLC devices will accelerate the rapid prevalence of ONU subscriber systems.

DETAILED DESCRIPTION OF THE PREFERRED EMBODIMENTS

No cost reduction would be accomplished by a blunt addition of a new part which has a function of reflecting only a certain wavelength of light to the optical communication modules shown in FIG. 1 to FIG. 5. The increase of the part would induce cost rising, structural complexity and enlarged size of the device. The present invention denies such a way of adding a new device to the LD, PD or LD/PD modules.

The present invention proposes an optical communication device having light guiding elements (optical fibers, quartz light waveguides, or plastic light waveguides), optoelectronic devices (PD, APD, LD or LED) and a grating formed in the light guiding elements which reflects only the detection light λ3 as a built-in detection light reflection member.

Since the grating (detection light reflection member) is made on the ready-made light guiding elements, the cost rise is small enough. The communication modules of the present invention have advantages of small size and low cost which are accomplished by the PLC technique and an extra advantage of having a detection light reflection function.

The light guiding elements here include two kinds of media. One is an optical fiber and the other is a light waveguide. Both the fiber and the waveguide are fitted on a substrate for connecting the optoelectronic devices to outer optical fibers. The present invention gives the detection light reflection function to the light guiding elements for endowing the module with the trouble detection function. The light waveguide, the optical fiber and the grating will be described for clarifying the present invention.

[Optical fiber] Optical fibers are assorted to multimode fibers and single-mode fibers. Otherwise, optical fibers are classified into quartz fibers and plastic fibers. A single-mode quartz fiber has a round core of a 10 $\mu$m diameter and a round cladding of a 125 $\mu$ m diameter surrounding the core and a round coating layer enclosing the cladding. The core has a refractive index higher than that of the cladding. The light travels in the core. This invention can be applied to any kinds of optical fibers, that is, multimode, single-mode, quartz or plastic ones.

Figure 7:
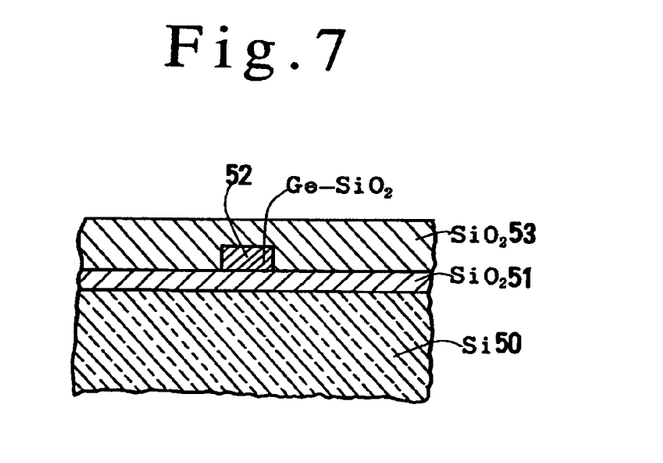
FIG. 7 is a section of a $SiO_2$ type light waveguide made upon a silicon substrate.

[Light waveguide] The light waveguide is a light travelling medium which is made directly on the substrate for the PLC device. FIG. 7 shows the section of the light waveguide. A Si substrate 50 is the base of the PLC device. The light waveguide is produced by piling an undercladding layer 51 upon the Si substrate 50 and making a linear stripe core 52 on the undercladding layer 51 by photolithography. The core 52 has a refractive index higher than the cladding layer and has a role of guiding light therein. Then an overcladding layer 53 is made for covering the core 52 and the undercladding layer 51. The substrate is a silicon substrate in the example. Otherwise, the substrate is made of plastics or ceramics. The materials of the cladding and the core are different for different substrate materials. Here, the silica ($SiO_2$) waveguide upon the Si substrate is described. In the case of the Si substrate, the cladding layers are made from $SiO_2$ by sputtering method or CVD method. The core is made by doping Ge into $SiO_2$ layer. Ge has the role of enhancing the refractive index of the $SiO_2$ layer.

Figure 8:
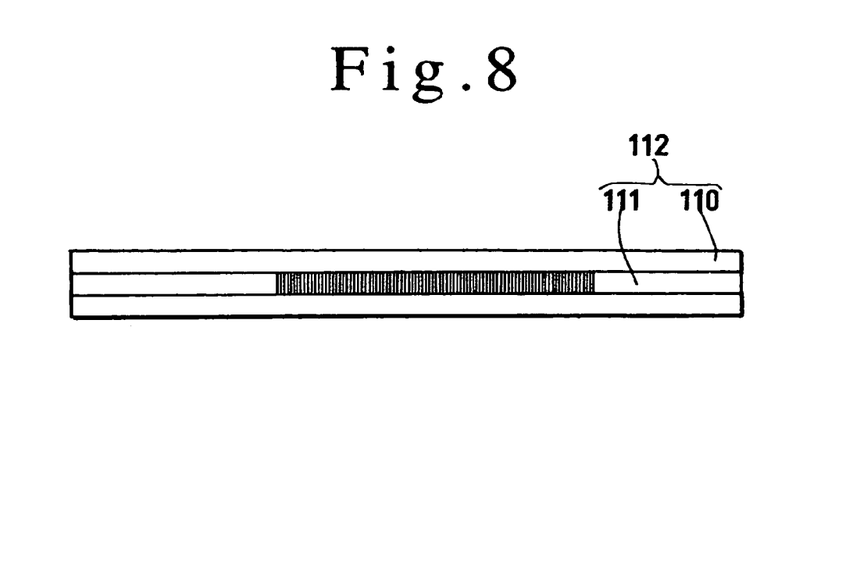
FIG. 8 is a horizontal section of a grating made in the fiber by allotting periodic refractive index oscillation to the fiber for giving selective reflectivity.

[Grating] The grating is the essential part in the present invention. The grating is directly made upon an optical fiber or a light waveguide for reflecting the detection light. Here, the grating produced upon the fiber is described. FIG. 8 shows a sectional view of the fiber having a grating without coating layer. A fiber 112 has a cladding 110 (125 $\mu$m in diameter) and a core 111 but has no coating. A periodic perturbation is given to the refractive index of the fiber core and the cladding. Short vertical lines indicate the periodic change of the refractive index of the core 111. A slight periodical change of refractive index of a period P gives the fiber the property of reflecting only the wavelength of λ=nP/m (n: refractive index, m: integer) but allowing other wavelengths to pass thorough without loss. The reason will be described afterward.

For example, the grating is formed by the binary beam interference exposure method which makes interference stripes by shooting an object with double strong, slanting coherent laser beams, for example, of an ultraviolet laser. The interference induces the desired periodic perturbation of refractive index. The method requires a strong power laser. The same method is available for making a grating upon the light waveguide instead of the fiber. The grating can be made upon a fiber or a waveguide by other methods.

A periodical change of the refractive index gives the core of the fiber or the waveguide the function of reflecting a certain wavelength λ. The above method produces the periodic perturbation of refractive index in the core and the claddings of the fiber or the waveguide. Mechanical method also gives the periodic change of the refractive index by pressing the fiber or the waveguide by a pressing member with saw teeth. Otherwise, the periodic perturbation of the refractive index is built in the fiber or the waveguide by covering the fiber or the waveguide with a mask having periodic stripes and etching the fiber or the waveguide through the striped mask. The binary beam interference exposure method is described here as an example.

[Binary beam interference exposure method] The optical fiber doped with germanium (Ge) is pretreated by doping hydrogen. A laser beam of a 244 nm wavelength is divided into binary beams by a half mirror. The two coherent beams irradiate the fiber or the waveguide on the condition of producing interference stripes for inducing the periodical perturbation of the refractive index. The hydrogen predoping facilitates the occurrence of the periodic change of the refractive index. The fiber experiences a perturbation of the refractive index in a certain period by the interference of the binary beams. The change of the refractive index is as small as an order of $10^{-5}$. The slight periodic perturbation of the refractive index in a sufficient length enables the fiber or the waveguide to reflect only the wavelength λ which is determined by λ=2 nP/s, where s is an integer, n is a refractive index and P is the period of the refractive index perturbation. Spatial gratings are common to optical devices which reflect various wavelengths determined by Bragg's relation λ=Psin θ/s, where P is the period, θ is an incidence angle and s is an integer. Unlike the commonplace spatial grating, the wavelength being reflected is kept to be constant in the grating of the present invention. The fiber or the waveguide is a one-dimensional media which allows only the vertical incidence to the grating but forbids the slanting incidence.

FIG. 8 shows an optical fiber 112 having a core 111 and a cladding 110 enclosing the core 111 and a grating (short parallel lines) formed in the core 111. In the case of the single mode fiber, the core has a diameter of 10 μm and the cladding has a diameter of 125 μm. The binary beam interference exposure method of an ultraviolet laser produces the periodic perturbation of the refractive index in the core and the cladding of the fiber. The part endowed with the periodic perturbation of the refractive index acts as a grating having the selective reflection.

[Principle of the selective reflection of the grating] The equation λ3=2 nP/s determines the period P of the refractive index fluctuation stripes (fringes) of the grating, where λ3 is the wavelength to be reflected, n is the refractive index of the core, P is the period of the grating and s is an integer. λ3 is the detection light. When λ1, λ2 and λ3 are introduced into the fiber or the waveguide, the grating allows λ1 and λ2 to pass through, but reflects λ3 entirely. The grating has such a wavelength selectivity of reflection. What brings about the selective reflection? The stripes of the grating having a period P are numbered with 1, 2, 3, . . . , m. An optical path length is defined to be a product of the length multiplied by the refractive index n. The optical path length from the 0-th stripe to the j-th stripe is jnP. Double optical length for going and returning is 2 jnP. The light of the wavenumber k (k=2 π/λ) is expressed by a wavefunction exp(-ikx).

The light of the wavenumber k is assumed to be reflected at the j-th stripe of the grating and to be turned to the 0-th stripe with amplitude ϵ. The phase of the reflected light at an interface with a rise of refractive index is increased by π. But the phase of the reflected light at another interface with a fall of refractive index is not changed. All the stripes have a common refractive index variation. The phase changes at all the stripes are the same for the light having the wavenumber k. The total amplitude A of the reflected and returned beams at the 0-th stripe is given by summing the reflection wavefunctions with delays of 2 jknP.

$$A = \varepsilon \sum_{j=1}^{m} \exp(-2iknjP) \qquad (1)$$

The symbol Σ means a sum of j taking integers from 1 to m. The power W of the reflection beams is a square of the amplitude A.

$$W = \varepsilon^2 \left\{ \sum_{j=1}^{m} \exp(-2iknjP) \right\} \left\{ \sum_{h=1}^{m} \exp(2iknhP) \right\} \qquad (2)$$
$$= \frac{\varepsilon^2 \sin^2(knmP)}{\sin^2(knP)}$$

W means the power of the reflected beams at the 0-th stripe. (1−W) is the power of the beams passing the grating (an assembly of the stripes) at the same time. ϵ is a very small value. If (knp) in the sine function in the denominator is not a multiple of π, W is a small value of an order of $\epsilon^2$. Otherwise if (knp) in the sine function in the denominator is a multiple of π, both the denominator and the numerator converge to zero.

What value does W takes at the limit of knp→sπ? Replacement of knP-s π=η changes the oscillating part of Eq.(2) into $\sin^2 m\eta / \sin^2 \eta$. The limit of $\sin^2 m\eta / \sin^2 \eta$, at η→0 is $m^2$. Namely, when knP=s π, the reflection power is $(\epsilon m)^2$. The wavenumber k is defined by k=2π/λ, which means that λ satisfies the equation of λ=2 nP/s.

For $$\lambda = 2nP/s, \ W = (\epsilon m)^2 \qquad (3)$$

$$\lambda \neq 2nP/s, \ W = 0 \qquad (4)$$

The reflection parameter ϵ is a small value. When the number m of the stripes included in the grating is an order of 1/ϵ, the right hand $(\epsilon m)^2$ of Eq.(3) can be nearly equal to 1. P and s should be determined to satisfy the condition λ3=2 nP/s for λ3. Then, λ3 would be perfectly reflected by the stripes of the grating made on the fiber or the waveguide. On the contrary, for λ1 (≠2 nP/s) and λ2(≠2 nP/s), (1−W)=1 from (4). Namely, λ1 and λ2 can penetrate the grating without reflection. W=1 is not a necessary condition implied for λ3. A finite value 0<W<1 is required for W of λ3.

When the receiving wavelength λ 2 is 1.55 μm and the detection wavelength λ3 is 1.65 μm, the wavelength difference is only 0.1 μm. The small difference increases the difficulty of discriminating λ3 from λ2. In this case, the stripe number m should be determined to be a value far larger than 1/ϵ (mϵ>>1). The large m (m E>>1; a long grating) gives perfect reflection W=1 for λ3.

What does Eq.(4) signify besides the λ3 reflection? Other wavelength except 2 nP/s, for example, λ1 and λ2, are not substantially reflected by the grating. This is another important matter. For example, in a set of wavelengths of the λ1 (transmitting)=1.3 μm, λ2 (receiving)=1.55 μm and λ3 (detection)=1.65 μm, the transmitting light λ1 and the receiving light λ2 are not reflected but penetrate the grating. Only the detection light λ3 is reflected by the grating formed in the fiber or the waveguide.

The meaning of the integer s is described. The integer s gives a freedom of the choice of the period P of the grating. If the parameter s is excluded from Eq.(3) and Eq. (4) (namely, s=1), the grating period P is P=0.6 μm for n=1.4 and λ3=1.65 μm. P=0.6 μm implies an ultraviolet laser emitting the light of a very short wavelength for the binary beam interference exposure. The binary beam interference exposure method makes interference fringes by dividing a laser beam into coherent binary beams by a beam splitter, shooting the binary beams at an object covered with a resist from symmetric angels of Φ and −Φ, letting the binary coherent beams interfere on the object, inducing interference fringes upon the resist, developing the resist into a patterned mask and etching the object over the resist mask with a pertinent etchant for making the periodic refractive index perturbation. The period P of the interference fringes is given by P=Λ/sinΦ, where Λ is the wavelength of the laser oscillation. Choice of a large slanting angle Φ enables the binary beams to produce a small period P of interference fringes. However, the slanting incidence angle Φ(0≦Φ<90°) should be determined to a value within a restricted range. Then, it is difficult to produce a small period P of interference fringes for s=1.

The parameter s which is an integer of more than one (s≧2) facilitates the formation of interference fringes of a small period. A plural s allows the laser emitting the light of a wavelength sΛ which is s times as large as the wavelength Λ to form the same interference fringes as the laser of the wavelength Λ. The parameter s has a favorable significance of reducing the laser wavelength substantially to Λ/s for producing interference fringes. However, the s of more than one has a drawback of reducing the number of stripes included in the grating into 1/s. The stripe number m is decreased by the plural number of s. As mentioned before, the stripe number m is a significant parameter for determining the reflection power of the grating. A larger m reflects the detection light stronger. Thus, the multiplication parameter s should be chosen by considering the wavelength of available power lasers and the margin of the length for making a grating in the fiber or the waveguide. The above description asserts that s=1 should not be a unique choice in the binary beam interference exposure.

In the example, the optical fiber is a quartz single mode fiber with a core doped with 6% $GeO_2$. A plurality of fibers are doped with hydrogen for facilitating the occurrence of the refractive index variation. After the hydrogen predoping treatment, a set of the optical fibers is irradiated by the SHG (second harmonic generation; λ=244 μm) of an argon laser in the posture of the binary beam interference exposure for making interference fringes. The length of the grating is about 4 mm. The period P of the grating is determined for selectively reflecting the detection light of λ3=1.65 μm. The 4 mm long grating has a reflection rate of more than 99% for λ3=1.65 μm.

When the device requires a higher λ3 reflection rate, a longer grating should be employed. For example, an 8 mm long grating enjoys a very high λ3 reflection rate of more than 99.9%.

The method of making a grating has been described with regard mainly to optical fibers hitherto. A similar method can make gratings also upon light waveguides with a $SiO_2$ core doped with Ge which are prevalent in PLC devices. The grating formed upon the waveguide has a similar wavelength selectivity of reflecting only the detection light.

This invention chooses the grating as a reflection device of the detection light partly because the grating dispenses with the mechanical treatment of digging a slit and the assembling treatment of a filter into the slit.

Besides the strong points in the case of the optical fibers, the grating has another advantage of high efficiency of production including the steps of arranging tens of optical fibers in contact parallely and exposing the fibers by the ultraviolet laser beams at a stroke and making gratings on the fibers simultaneously.

In the case of the light waveguides on a silicon wafer, a plenty of units (for a chip) with light waveguides have been fabricated upon a large single Si wafer. Many gratings are made by scanning the wafer and irradiating the waveguides of the chip units by the binary ultraviolet laser beams chip by chip. In the case of the waveguides, the conventional semiconductor wafer process is applicable to make the gratings on the units (chips afterwards) sequentially: The process is free from contamination. It takes a short time to produce many gratings. The gratings formed on the fibers or the waveguides are low-cost devices for the selective reflection.

Embodiment 1

Figure 9:
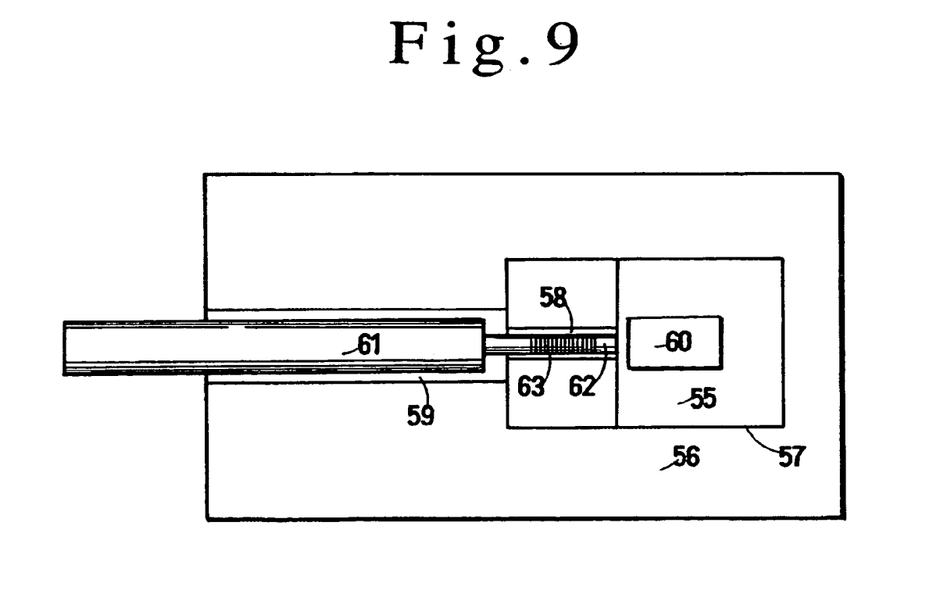
FIG. 9 is a plan view of Embodiment 1 of the present invention applied to a single function communication device having an optoelectronic device (LD, PD or LED).
Figure 10:
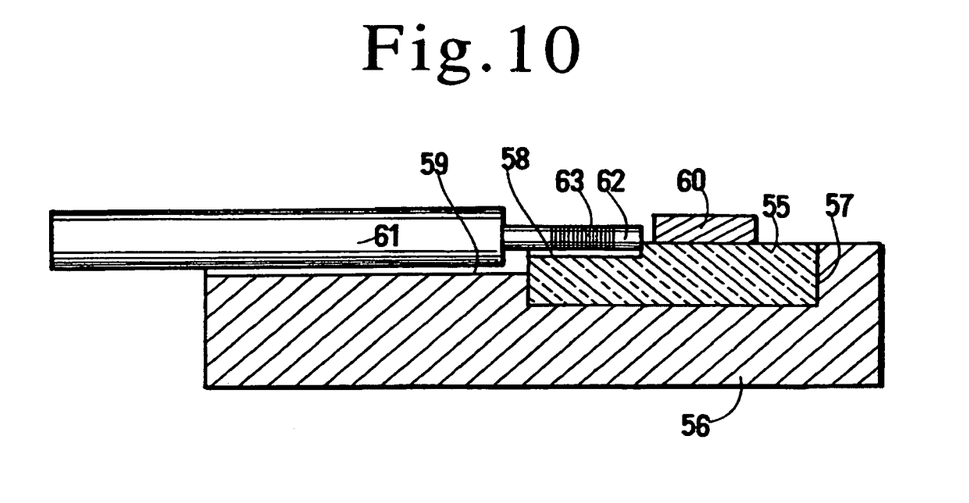
FIG. 10 is a vertically sectioned view of Embodiment 1 of the present invention applied to a single function communication device having an optoelectronic device (LD, PD or LED) and an optical fiber.

(Single Fiber; V-Groove, Unifunction Device; FIGS. 9, 10)

This invention enjoys a wide range of application to conventional optical communication devices. Embodiment 1 is the simplest application to a unifunction device having an optical fiber as a light guide and an optoelectronic device (LD, LED, PD or APD). FIG. 9 is a plan view of Embodiment 1. FIG. 10 is a central vertical section of Embodiment 1. The light guide is a quartz optical fiber. The fiber has a grating having functions of reflecting the detection light of 1.65 μm and of allowing the signal light of 1.55 μm or 1.3 μm to penetrate through.

Despite the simple function, Embodiment 1 employs a sophisticated substrate consisting of a smaller first substrate 55 and a larger second substrate 56. The second substrate 56 has a cavity 57. The first substrate 55 is embedded into the cavity 57 of the second substrate 56. The first substrate 55 is preferably made of silicon single crystal suitable for the precise processing by photolithography. The second substrate is favorably made of an inexpensive, moldable material, for example, plastics. Since the plastic is more inexpensive than silicon single crystal, the double substrate (Si+plastic) is less expensive than an entirely silicon substrate. The first substrate 55 has a smaller V-groove 58 extending in the longitudinal direction on a front half. The second substrate 56 has a larger V-groove 59 extending in the longitudinal direction on a front half. In the coupled state, the V-grooves 58 and 59 align along a common straight line. An optoelectronic device 60 (LD, PD, LED or APD) is mounted at the end of the V-groove 58 upon the first substrate 55.

The light guide is an optical fiber 62 partially sustained by a ferrule 61. An adhesive maintains the ferrule 61 in the larger V-groove 59. The smaller V-groove 58 keeps the fiber 62 with the same adhesive. The fiber 62 has a grating 63 which is an assembly of stripes arranged in a common spacing (period P). The grating 63 has the desired detection light reflection function which selectively reflects only the detection light (e.g., 1.65 μm).

In Embodiment 1, the fiber core diameter is 10 μm and the fiber cladding diameter is 125 μm. The length of the grating 63 is about 5 mm. The reflection rate for 1.65 μm is more than 99%. The transparency ratio for 1.3 μm and 1.55 μm are more than 90%.

Embodiment 1 gives the detection light reflection function to an LD module or an PD module which has advantages of low-cost and small-size deriving from the PLC (planar lightguide circuit) structure assembled upon a substrate. The Si+plastic double structure substrate can be replaced by a full silicon substrate or a full plastic substrate (e.g., polyimide).

Embodiment 2

Figure 11:
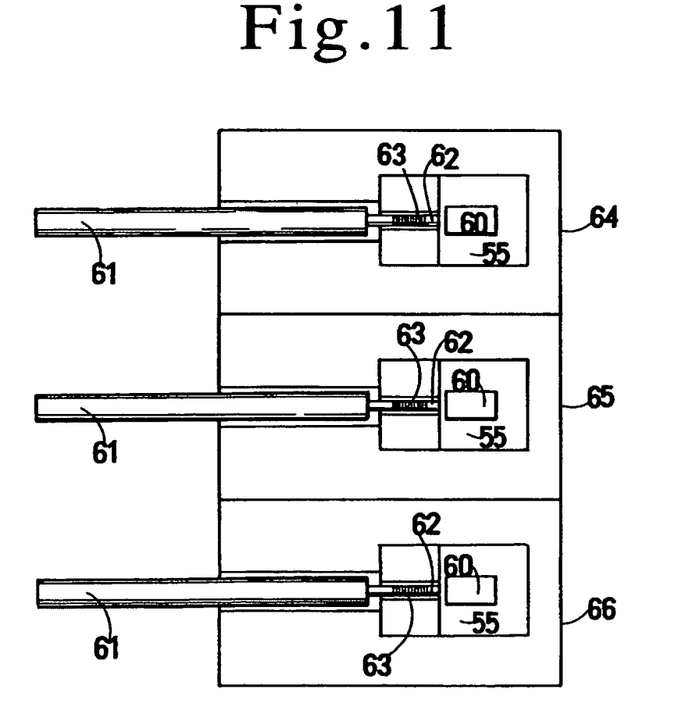
FIG. 11 is a plan view of Embodiment 2 of the present invention applied to a plurality of single function communication devices having optoelectronic devices (LD, PD or LED) facing inherent fibers.

(Plural Fibers; Plural Chips, V-Groove, Multifunction Device; FIG. 11)

Embodiment 2 is an assembly of the unifunction devices each of which has an inherent optical fiber with a ferrule and an inherent optoelectronic device (LD, LED, PD or APD). An assembly of all LD devices builds a simultaneous multi-transmitting module. An assembly of all PD devices makes a simultaneous multi-receiving module. An assembly of k PD devices and m LD devices (m≧1, k≧1) makes a simultaneous multi-transmitting/receiving module. FIG. 11 is a plan view of Embodiment 2.

Here, three unifunction devices 64, 65 and 66 are shown in FIG. 11 as an example. Embodiment 2 includes any number of devices. The unifunction device 64 has a double structure substrate, a fiber, a ferrule, a chip 60 and a grating 63 made upon the fiber. The others 65 and 66 have similar members. The grating 63 has the function of the selective reflection of the detection light. All the fibers 62 sustained by the ferrule 61 have a simple function of guiding either the receiving light or the transmitting (sending) light. All the device chips 60 have inherent fibers 62. The isolation of the fibers 62 effectively suppresses the crosstalk among the device chips 60.

Embodiment 3

Figure 12:
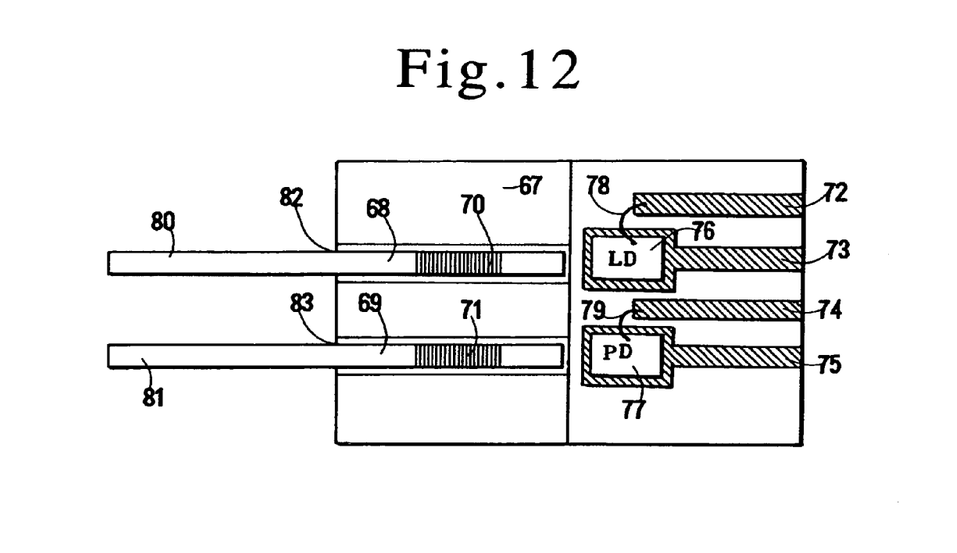
FIG. 12 is a plan view of Embodiment 3 of the present invention applied to a plural function communication device having an LD and a PD fixed at the front ends of binary fibers on the same substrate for the simultaneous bidirectional optical communication.

(Binary Fibers; V-Grooves, LD/PD Device; FIG. 12)

Embodiment 3 (FIG. 12) is an application to a simultaneous bidirectional optical communication module having binary fibers, an LD and a PD. Fibers 68 and 69 are fixed in V-grooves upon a PLC substrate 67. The binary optical fibers 68 and 69 have gratings 70 and 71 for the selective reflection of the detection light. The rear half of the substrate has metallized patterns 72, 73, 74 and 75. An LD 76 and a PD 77 are mounted upon the metallized patterns 73 and 75. The electrodes of the LD and the PD are bonded with the metallizes 72 and 74 with wires 78 and 79. The LD 76 launches transmitting light into the fiber 68. The PD 77 senses the receiving light emitted from the fiber 69. Since the LD 76 and the PD 77 have independent fibers 68 and 69, the transmitting light and the receiving light are independent. The independent fibers allow a common wavelength as well as different wavelengths for the transmitting light and the receiving light.

The optical fibers 68 and 69 have the gratings 70 and 71 for the selective reflection of the detection light. The fibers 68 and 69 can be replaced by light waveguides with gratings made on the PLC substrate. The parallel inner fibers 68 and 69 are joined with outer fibers 80 and 81 at the front ends 82 and 83. The outer fibers 80 and 81 are directly butted to the inner fibers 68 and 69 without converging lenses. In the case of the light waveguides, the outer fibers can be butted to the light waveguides without lenses.

Embodiment 4

Figure 13:
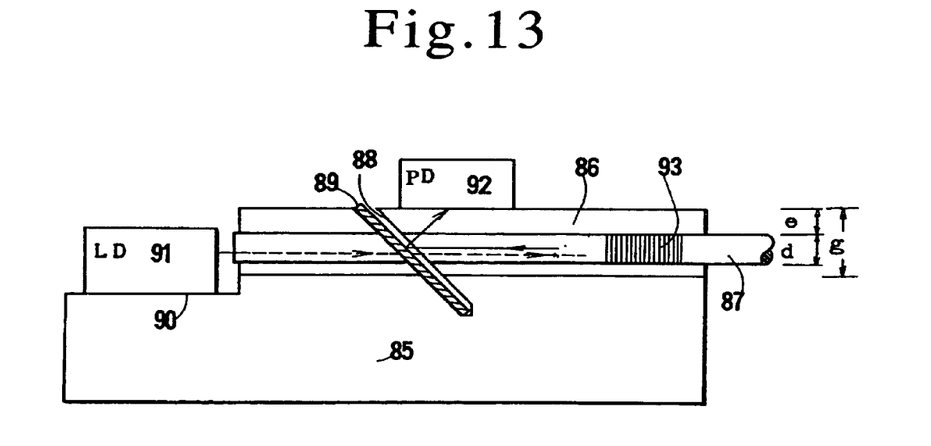
FIG. 13 is a vertically sectioned view of Embodiment 4 of the present invention applied to a plural function communication device having an LD, a PD and a WDM mounted upon the same substrate for the simultaneous bidirectional optical communication with a single fiber.

(Multiwavelength; Single Fiber; V-Grooves, LD/PD Device; FIG. 13)

Embodiment 4 (FIG. 13) is an application to a multiwavelength, bidirectional, simultaneous transmitting/receiving module. A V-groove 86 is cut along a central axial line on a flat substrate 85. An optical fiber 87 is embedded into the V-groove 86 with an adhesive. A slanting slit 88 is made in the midway of the V-groove 86 by cutting the substrate 85. A WDM filter 89 with wavelength selectivity is inserted-into the slanting slit 88. The substrate 85 has a lower step 90 at the back end. An LD 91 is bonded upon the step 90 along an extension of the fiber 87. Bridging the V-groove 86, a PD 92 is fixed above the WDM 89 at a point suitable for sensing the receiving light reflected by the WDM 89. In the case of a top incidence PD, the PD should be upside down (epi-down) bonded on the substrate for guiding the light to the top sensing region of the PD. In the case of a bottom incidence PD, the PD should be epi-up bonded on the substrate for guiding the light via the bottom to the top sensing region. Travelling the fiber 87, the receiving light λ2 is reflected by the WDM filter 89 and is led to the PD 92. The LD 91 emits transmitting light which goes into the fiber 87 and propagates to the central station. The fiber bears a grating 93 midway.

In the example, 1.3 μm is the transmitting light λ1 and 1.55 μm is the receiving light λ2. The grating 93 reflects the detection light λ3 (e.g., 1.65 μm) without disturbing the travel of λ1 and λ2. The example is an application of the present invention to the prior art multiwavelength bidirectional simultaneous communication system as shown in FIG. 6.

Embodiment 5

Figure 14:
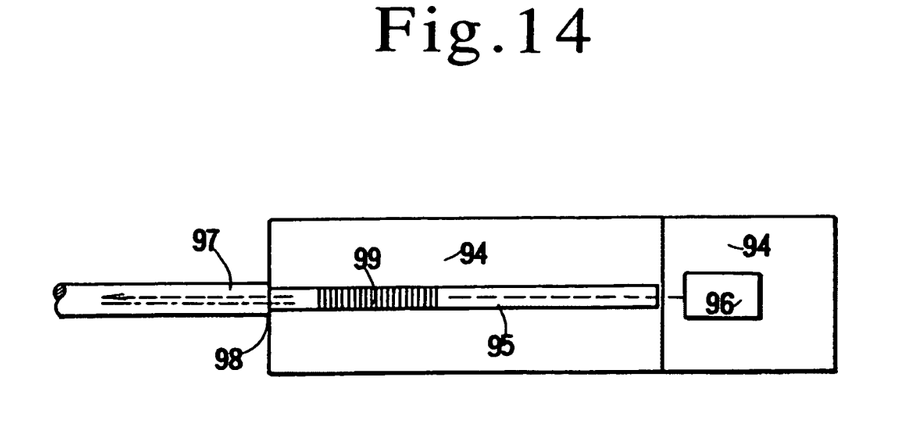
FIG. 14 is a plan view of Embodiment 5 of the present invention applied to a single function communication device having an optoelectronic device (LD, PD or LED) and a light waveguide on a substrate.

(Single Waveguide; Unifunction Device; FIG. 14)

Embodiment 4 (FIG. 14) is the simplest application to a unifunction device having a light waveguide formed upon a Si or $SiO_2$-glass substrate as a light guide and an optoelectronic device (LD, LED, PD or APD). Embodiment 4 (FIG. 14) is different from Embodiment 1 of FIG. 9 in the light guide. A light waveguide 95 is made along a central axial line on a flat substrate 94 for leading light instead of the fiber. A lower step is formed on the rear end of the substrate 94. An optoelectronic chip 96 (LD, PD, LED, APD etc.) is mounted at an extension of the light waveguide 95 upon the lower step. An outer fiber 97 is butted to the end of the light waveguide 95 at the front end 98. A grating 99 is formed halfway on the light waveguide 95 for reflecting the detection light toward the central station.

Embodiment 4 has the detection light reflection function by the grating 99 made upon the waveguide 95 formed on the substrate 94. Embodiment 4 has a strong point of high possibility of assigning various functions to the waveguide. Besides the grating 99, the waveguide 95 enables Embodiment 5 to add another grating filter allowing a special wavelength to penetrate for annihilating the sensitivity to extra wavelengths or to add another grating as a resonator of the LD (here LD 96) for stabilizing the oscillation wavelength of the LD 96.

Embodiment 6

Figure 15:
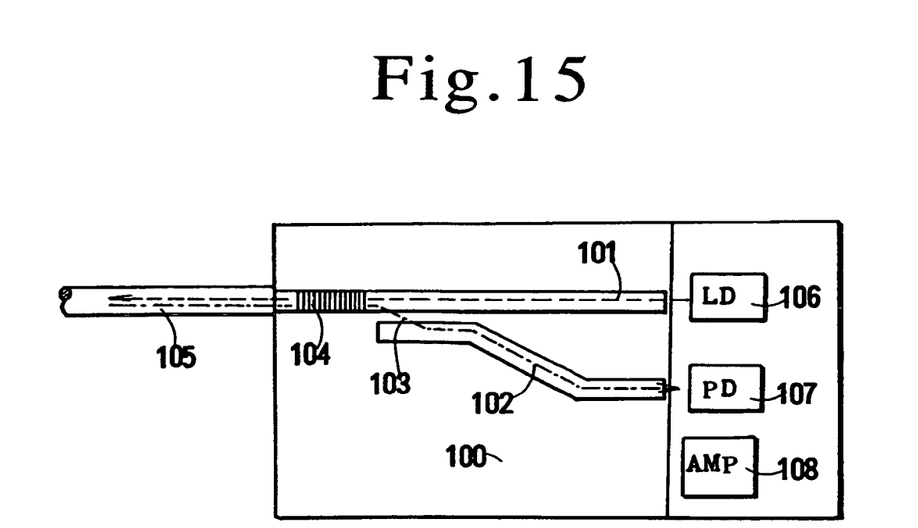
FIG. 15 is a plan view of Embodiment 6 of the present invention applied to a binary function communication device (LD/PD module) having an LD, a PD, an AMP and branched light waveguides formed upon a substrate for combining the PD and the LD selectively to an outer fiber for the simultaneous bidirectional optical communication.

(Y-Branched Waveguides; LD/PD Module; FIG. 15)

FIG. 15 shows Embodiment 5 which is an application to an LD/PD module having Y-branched light waveguides formed upon a substrate, an LD, a PD and an AMP. Embodiment 5 (FIG. 15) is different from Embodiment 3 of FIG. 12 in the light guides and the AMP. A first light waveguide 101 and a second light waveguide 102 are formed on a silicon substrate or a quartz-glass substrate 100 by the sputtering, the CVD and the photolithography. The cores of the waveguides are endowed with a higher refractive index by doping with Ge. The waveguides 101 and 102 can selectively exchange energy of travelling light at a coupling part 103. An outer optical fiber 105 is butted to a front end of the waveguide 101 at the front end of the substrate 100. The light waveguide 101 has a grating 104 having the selective reflection function for reflecting only the detection light. An LD 106 is bonded at a rear end of the first light waveguide 101 on the rear step of the substrate 100. A PD 107 is bonded at a rear end of the second light waveguide 102 on the rear step of the substrate 100. The rear step sustains an AMP 108 for amplifying the photocurrent of the PD 107. In practice, metallized patterns and wires connect electrodes of the chips and lead frames electrically. But the patterns and the wires are omitted in FIG. 15.

The coupling part 103 selectively allocates the receiving light $\lambda 2$ to the second light waveguide 102 and the transmitting (sending) light $\lambda 1$ to the first light waveguide 101. The transmitting light emitted from the LD 106 propagates in the first light waveguide 101 and travels in the outer fiber 105 in the left direction. The receiving light spreading in the outer fiber 105 goes into the end of the waveguide, turns to the second waveguide 102 at the coupling part 103, shoots the PD 107 and generates a photocurrent in the PD 107.

In the example, 1.3 $\mu$m is the transmitting light $\lambda 1$ and 1.55 $\mu$m is the receiving light $\lambda 2$. The coupling part 103 which separates 1.3 $\mu$m and 1.55 $\mu$m can be replaced by a set of a simple Y-branch and a WDM filter which has the wavelength selectivity of leading 1.3 $\mu$m but reflecting 1.55 $\mu$m.

The grating 104 gives Embodiment 6 the detection light reflection function. Like Embodiment 5, Embodiment 6 has an advantage of the possibility of adding various functions to the waveguides 101 and 102.

The existence of the waveguides enables Embodiment 6 to provide the waveguide 102 with another grating filter allowing a special wavelength to penetrate for annihilating the sensitivity of the PD 107 to extra wavelengths or to provide the waveguide 101 with another grating as a resonator of the LD 106 for stabilizing the oscillation wavelength of the LD 106.

The waveguide type LD/PD modules are prevalent in the bidirectional multiwavelength optical communication system in FIG. 6 because of the unification of the transmitting and receiving functions and the accumulation of other multifunctions.

The silicon bench is a rectangle of a 20 mm length, a 7 mm width and a 1.5 mm thickness. An $SiO_2$ undercladding layer, an $SiO_2$+Ge core and a $SiO_2$ overcladding layer are produced upon the silicon bench by the blaze deposition method. The $SiO_2$+Ge core has a section of 6 $\mu$m×6 $\mu$m. The core and the claddings have a refractive index difference of 0.4%. The section of the waveguide is the same as FIG. 7.

The LD 106 is a 1.3 $\mu$m MQW (multiquantum well) InGaAsP laser diode. The PD 107 is a waveguide type PIN photodiode which introduces light via the front end. The transmitting light (1.3 $\mu$m) and the receiving light (1.55 $\mu$m) are separated by the coupling part 103 being a Mach-Zender type coupler. The AMP 108 which is a preamplifier for 156 Mbps is mounted in the vicinity of the PD for enhancing the sensitivity. The length of the grating 104 is 4 mm. The 4 mm long grating enjoys more than 99% of the reflection rate for the detection light (1.65 $\mu$m).

The joints between the fiber and the waveguide and between the waveguides and the LD or the PD are covered with a resin with a refractive index similar both to the fiber and the waveguide. It is confirmed that the LD/PD module can transmit and receive 156 Mbps signals (1.3 $\mu$m transmitting signals and 1.55 $\mu$m receiving signals). It is also confirmed that the detection light of 1.65 $\mu$m is reflecting back to the central station.

We claim:

1. An optical communication device for reflecting detection light of a wavelength to a central station in order to find disorders in a light guide, comprising:
   a substrate;
   at least one optical fiber for guiding the detection light and for guiding signal light of a wavelength different from the detection light;
   at least one ferrule for holding a part of the optical fiber near an end of the fiber;
   at least one optoelectronic device chip mounted upon the substrate and facing the end of the optical fiber for producing transmitting signal light for the central station or for receiving signals from the central station via the optical fiber; and
   a detection light reflecting grating located on a part of the optical fiber outside of the ferrule and between the ferrule and the optoelectronic device the grating allowing the signal light to penetrate therethrough but reflecting the detection light emitted from the central station to direct the detection light back via the same optical fiber to the central station so that the central station detects the occurrence of disorders in the optical fiber between the central station and the optical communication device by receiving or not receiving the detection light.

2. The optical communication device according to claim 1, wherein a plurality of independent optical fibers having the detection light reflecting gratings are held by ferrules and an optoelectronic device is allocated at an end of each of the optical fibers for exchanging a plurality of signals via a plurality of fibers.

3. The optical communication device according to claim 2, wherein all the optoelectronic devices are PDs (photodiodes) for receiving a plurality of independent signals simultaneously.

4. The optical communication device according to claim 2, wherein all the optoelectronic devices are LDs (laser diodes) for transmitting a plurality of independent signals simultaneously.

5. The optical communication device according to claim 2, wherein m optoelectronic devices are LDs (laser diodes) for transmitting a plurality of independent signals simultaneously and k optoelectronic devices are PDs (photodiodes) for receiving a plurality of independent signals simultaneously.

6. The optical communication device according to claim 1, wherein the substrate is a complex substrate being composed of a smaller first substrate of silicon single crystal and a larger second substrate being made of plastic and having a cavity and the substrates are coupled by putting the first substrate in the cavity of the second substrate.

7. The optical communication device according to claim 6, wherein the optoelectronic device is mounted upon the smaller first substrate and the fiber is supported by both the first and the second substrates.

8. The optical communication device according to claim 7, wherein the first substrate and the second substrate have V-grooves dug along center lines in longitudinal directions, the fiber is partially held by a ferrule and the ferrule is supported by the V-groove on the second substrate and the fiber is supported by the V-groove on the first substrate.

* * * * *